E. S. BERRY.
AUTOMATIC SAW SHARPENING MACHINE.
APPLICATION FILED MAR. 30, 1910.

1,049,980.

Patented Jan. 7, 1913.

WITNESSES:

INVENTOR
Elwin S. Berry
BY
ATTORNEYS

E. S. BERRY.
AUTOMATIC SAW SHARPENING MACHINE.
APPLICATION FILED MAR. 30, 1910.

1,049,980.

Patented Jan. 7, 1913.

WITNESSES:

INVENTOR
Elwin S. Berry
BY Munn & Co.
ATTORNEYS

E. S. BERRY.
AUTOMATIC SAW SHARPENING MACHINE.
APPLICATION FILED MAR. 30, 1910.

1,049,980.

Patented Jan. 7, 1913.

WITNESSES:

INVENTOR
Elwin S. Berry
BY
ATTORNEYS

E. S. BERRY.
AUTOMATIC SAW SHARPENING MACHINE.
APPLICATION FILED MAR. 30, 1910.

1,049,980.

Patented Jan. 7, 1913.
6 SHEETS—SHEET 5.

WITNESSES:
Geo N Naylor
Rev G Hooker

INVENTOR
Elwin S. Berry
BY Munn & Co.
ATTORNEYS

E. S. BERRY.
AUTOMATIC SAW SHARPENING MACHINE.
APPLICATION FILED MAR. 30, 1910.

1,049,980.

Patented Jan. 7, 1913.
6 SHEETS—SHEET 6.

WITNESSES:
Geo. W. Naylor
Rudy. Hoodtz

INVENTOR
Elwin S. Berry
BY Munn & Co.
ATTORNEYS

UNITED STATES PATENT OFFICE.

ELWIN SOLON BERRY, OF PUTNAMVILLE, VERMONT, ASSIGNOR TO O. V. HOOKER AND SON, OF ST. JOHNSBURY, VERMONT, A CORPORATION.

AUTOMATIC SAW-SHARPENING MACHINE.

1,049,980.  Specification of Letters Patent.  Patented Jan. 7, 1913.

Application filed March 30, 1910. Serial No. 552,337.

*To all whom it may concern:*

Be it known that I, ELWIN S. BERRY, a citizen of the United States, and a resident of Putnamville, a village in the town of Middlesex, in the county of Washington and State of Vermont, have invented a new and Improved Automatic Saw-Sharpening Machine, of which the following is a full, clear, and exact description.

The object of the invention is to provide a new and improved automatic saw sharpening machine, more especially designed for grinding, sharpening or gumming the teeth of straight or circular saws, and arranged to allow running the machine at a high speed, to quickly sharpen the saw, to insure positive intermittent feeding of the saw and positive movement of the grinding wheel to and from the saw, and to reduce vibration to a minimum and thus permit accurate and uniform sharpening of the teeth of a saw.

For the purpose mentioned, use is made of a revoluble grinding wheel, adapted to move bodily in and out of grinding engagement with the saw, and a feeding device for intermittently advancing the saw a distance corresponding to the length of the tooth of a saw, the feeding movement beginning during the receding of the grinding wheel, so that the top or back of the next saw tooth is in contact with the grinding wheel, and consequently at each operation the front and throat of a saw tooth and the back of the next following saw tooth are subjected to a grinding action.

A practical embodiment of the invention is represented in the accompanying drawings forming a part of this specification, in which similar characters of reference indicate corresponding parts in all the views.

Figure 6:
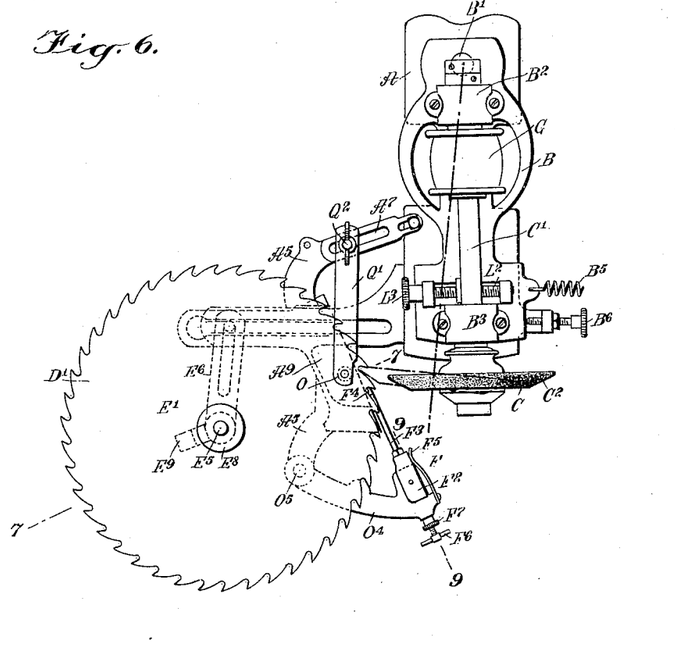
Fig. 6 is a plan view of the machine arranged for sharpening the teeth of circular saws.
Figure 7:
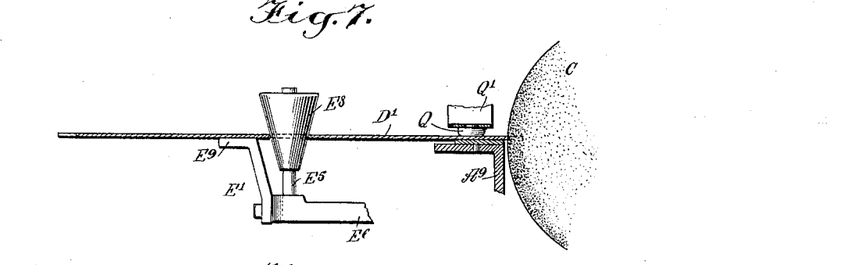
Fig. 7 is a sectional front elevation of the same on the line 7—7 of Fig. 6.
Figure 8:
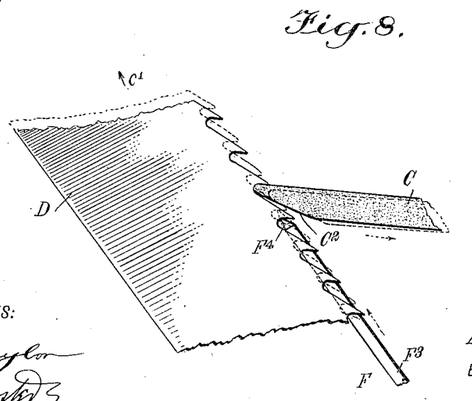
Fig. 8 is an enlarged plan view of part of the grinding wheel and a straight saw and its feeding device.

On the top of a suitably constructed main frame A is pivoted at $B'$ a horizontally-extending arm B, supporting bearings $B^2$, $B^3$, in which is mounted to turn the shaft or spindle $C'$ of a grinding wheel C, removably held on the said shaft or spindle. By imparting a swinging motion to the arm B from the right to the left, the peripheral face of the grinding wheel C is bodily moved into grinding engagement with the teeth of a saw to be sharpened, it being understood that in case the saw is a straight or band saw D, it is mounted on a support E (see Figs. 1, 2, 3 and 5), and if a circular saw $D'$ is to be sharpened it is mounted on a support $E'$ (see Figs. 1, 2, 3, 6 and 7), the said supports E and $E'$ being removably and adjustably held on the main frame A, as hereinafter more fully explained. The peripheral face of the grinding wheel C is shaped to engage the front and throat of a tooth of the saw D or $D'$ to be sharpened at the time (see Figs. 6 and 8) and during the time the saw D or $D'$ is at rest. A feeding device F serves to engage the saw D or $D'$, to intermittently advance the same the distance of the length of a saw tooth, and the arrangement is such that the feeding movement begins at the time the grinding wheel C recedes from the front and throat of the saw tooth, so that the back of the next following saw tooth is moved into grinding contact with the front beveled portion $C^2$ of the grinding wheel C. Thus during each action, the front and throat of one tooth are ground and the back of the next following tooth.

On the shaft $C'$ of the grinding wheel C is secured a pulley G, connected by a belt $G'$ with a pulley $G^2$, secured on the main driving shaft H, provided with fast and loose pulleys $H'$, connected by belt with other machinery, for imparting a rotary motion to the main driving shaft H, which by the pulleys $G^2$, G and the belt $G'$ rotates the shaft $C'$ and consequently the grinding wheel C. The main driving shaft H is journaled in bearings $H^2$, $H^3$, of which the bearing $H^2$ is hung on trunnions $H^4$ carried by the main frame A, so as to permit of swinging the shaft H up or down, and the bearing $H^3$ is pivoted at one side at $H^5$ on the main frame A, and is pressed on at its other side by a spring-pressed yoke $H^6$, to hold the free end of the bearing $H^3$ in contact with a lever $H^7$, fulcrumed on the main frame A. A hand lever $H^8$, likewise fulcrumed on the frame A (see Fig. 1) engages the lever $H^7$, so as to permit the operator having hold of the lever $H^8$, to impart a swinging motion to the latter in the direction of the arrow $a'$, to impart a swinging motion to the lever $H^7$ in an opposite direction, to swing the bearing $H^3$ upward against the tension of the spring-pressed yoke $H^6$. On the shaft H, adjacent to the bearing $H^3$ is secured a friction pinion I, adapted to engage a friction wheel $I'$, secured on a transversely-extending cam shaft $I^2$, journaled in suitable bearings on the main frame A. On the opposite faces of the wheel $I'$ are secured cams J and K, of which the cam J controls the bodily sidewise movement of the grinding wheel C, while the cam K controls the feeding device F.

Figure 1:
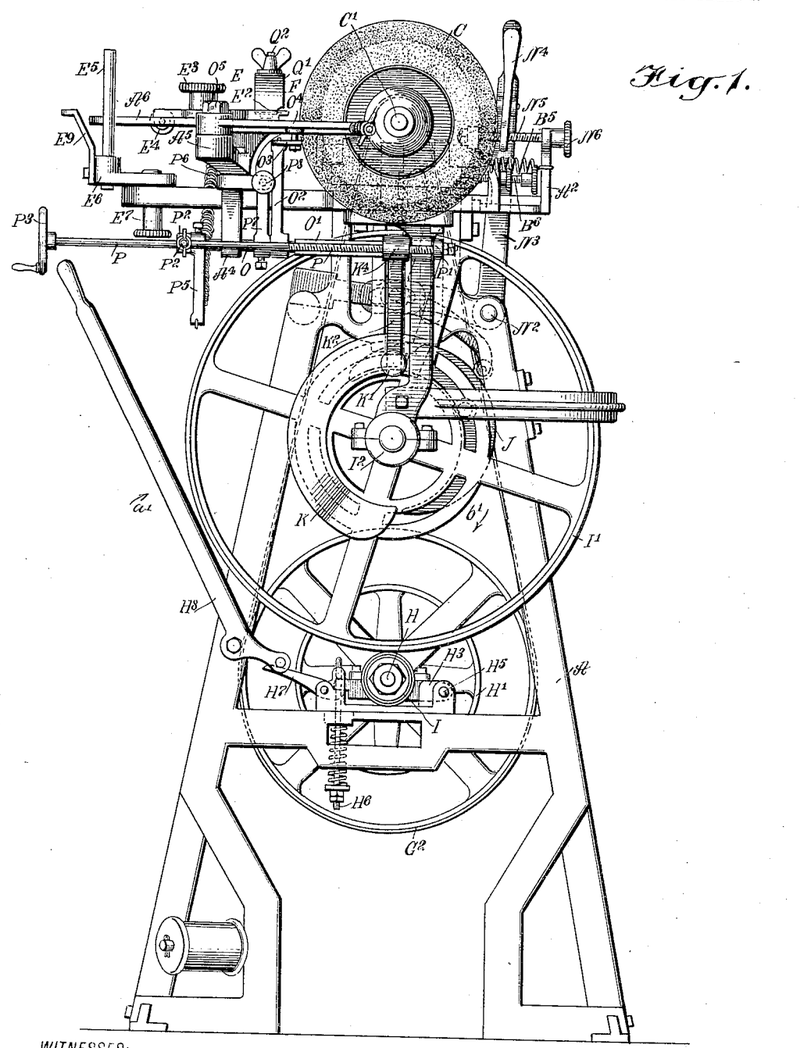
Figure 1 is a front elevation of the machine arranged for sharpening the teeth of straight saws.
Figure 2:
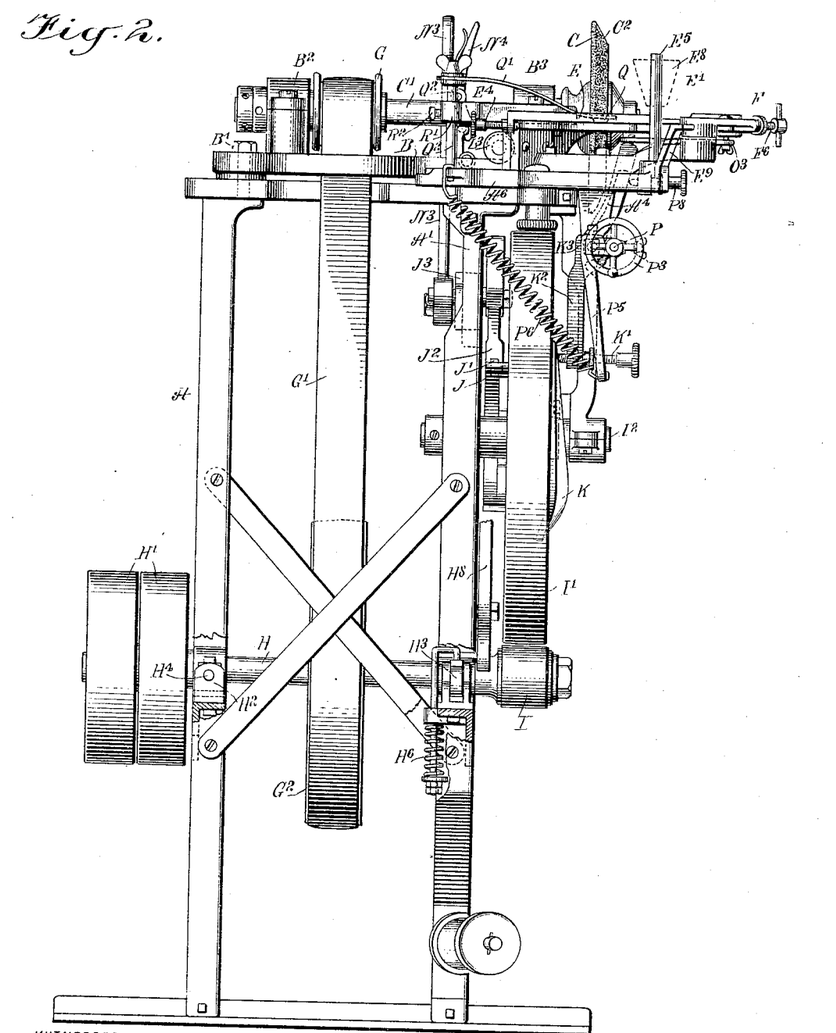
Fig. 2 is a side elevation of the same, parts being in section.
Figure 3:
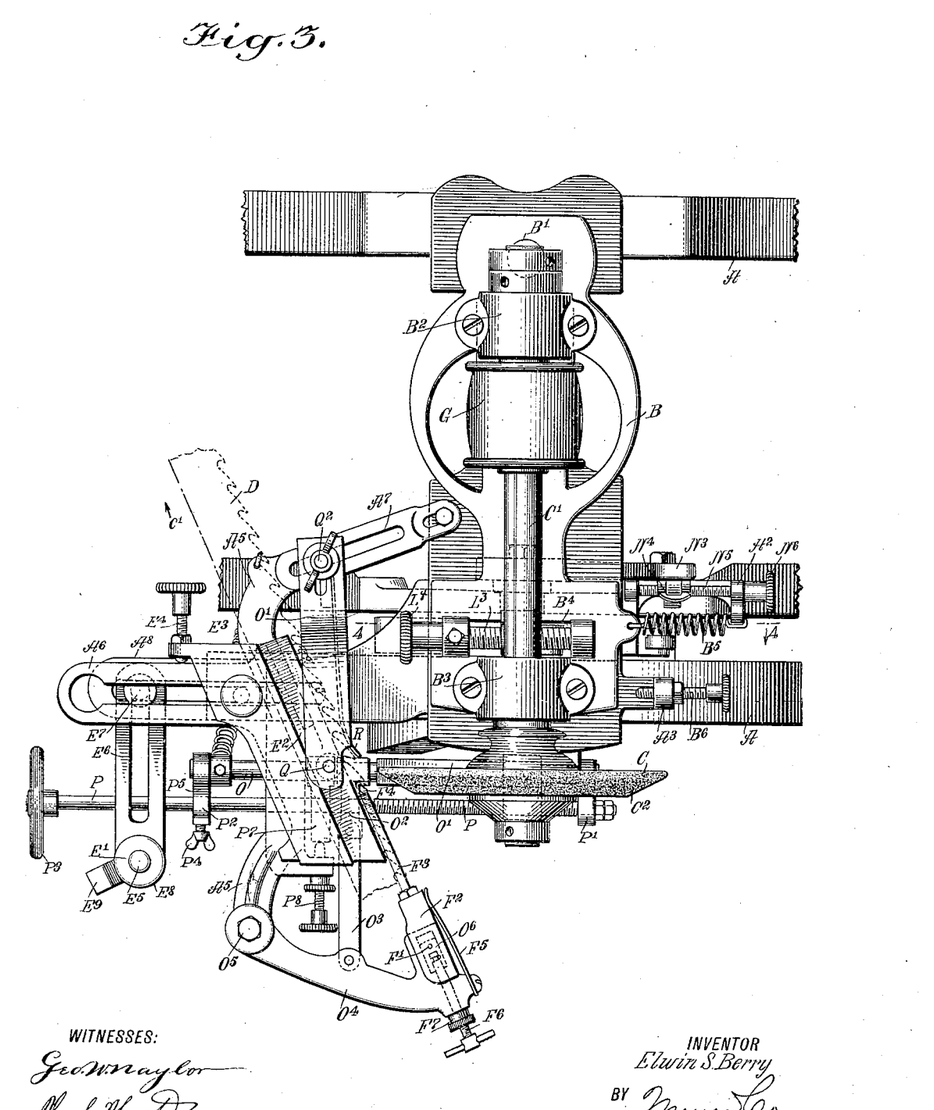
Fig. 3 is an enlarged plan view of the same.

It is understood that normally the pinion I is out of engagement with the friction wheel $I'$, but when the operator presses the lever $H^8$ as described, the shaft H is swung upward, so as to move the friction pinion I in peripheral contact with the friction wheel $I'$, whereby the latter is driven from the shaft H, and consequently a rotary motion is given to the cam shaft $I^2$ and its cams J and K, in the direction of the arrow $b'$ (see Fig. 1).

Figure 4:
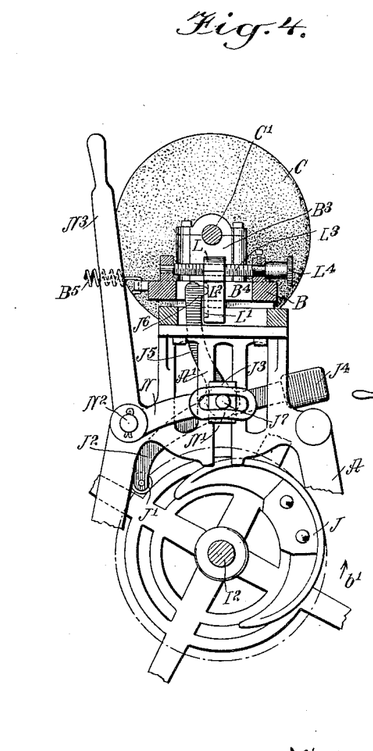
Fig. 4 is a rear sectional elevation of the same on the line 4—4 of Fig. 3.
Figure 5:
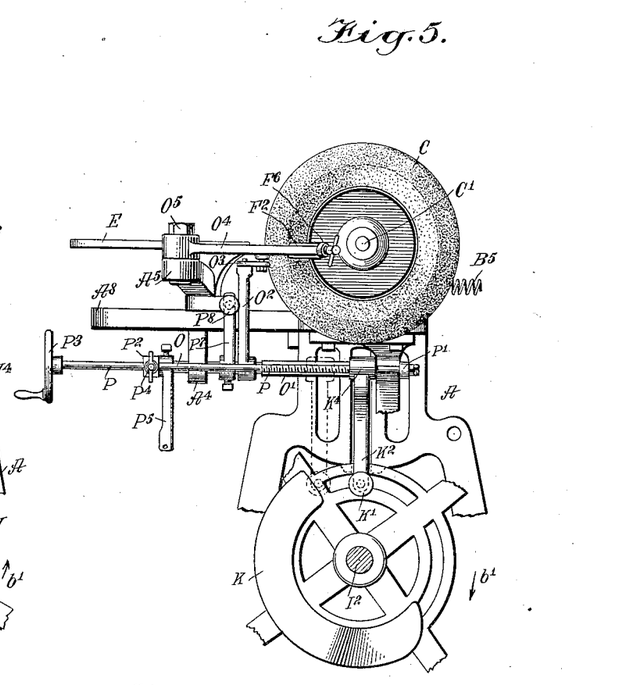
Fig. 5 is a front elevation of the machine, part of the driving mechanism being removed.

In order to control the sidewise movement of the grinding wheel C from the shaft H, the following arrangement is made: A friction roller $J'$ on one end of a lever $J^2$, is adapted to be engaged by the peripheral face of the cam J (see Fig. 4), and the lever $J^2$ is fulcrumed on a block $J^3$, mounted to slide up and down in a guideway $A'$, formed on the main frame A. The lever $J^2$ is provided with a counter-weight $J^4$ and with an upwardly-extending arm $J^5$, terminating in a point $J^6$, extending into a vertically-disposed groove $L'$, formed in the lower portion $L^2$ of a nut L, in which screws a screw rod $L^3$, mounted to turn in suitable bearings arranged on the top of the arm B, on which the shaft $C'$ is journaled. The lower portion $L^2$ of the nut L extends through a slot $B^4$ in the arm B, as plainly indicated in Figs. 2 and 4, and one outer end of the screw rod $L^3$ is provided with a knob or a handle $L^4$ under the control of the operator, for turning the screw rod $L^3$, with a view to shift the nut L to the right or to the left, according to the direction in which the screw rod $L^3$ is turned. Now by shifting the nut L, the latter acts on the arm $J^5$, to impart a swinging motion to the lever $J^2$, so as to hold the friction roller $J'$ thereof farther in or farther out from the center of the cam shaft $I^2$ by the cam J and sooner or later the hand lever $J^2$, as the case may be.

It is understood that the counter-weight $J^4$ holds the point $J^6$ at all times in engagement with the groove $L'$ of the lower end $L^2$ of the nut L.

The block $J^3$, previously mentioned, and on which the lever $J^2$ is fulcrumed, is provided with a pin $J^7$, projecting into an elongated slot $N'$ of a lever N, fulcrumed at $N^2$ on the main frame A, and provided with an upwardly-extending handle $N^3$, provided near its upper end with a pivoted half-nut $N^4$, adapted to engage a screw rod $N^5$, screwing in a bearing $A^2$ forming part of the main frame A. One outer end of the screw rod $N^5$ is provided with a knob or a handle $N^6$, under the control of the operator for turning the screw rod $N^5$, so as to shift the handle $N^3$ to the right or to the left, thereby imparting an up and down swinging motion to the lever N, to raise or lower the block $J^3$ and consequently the fulcrum for the lever $J^2$, to cause the cam J to engage the friction roller $J'$ sooner or later, according to the depth of the tooth to be sharpened by the grinding wheel C. The arm B is pressed on at its right-hand side by a spring $B^5$, attached to a bearing $A^2$, to normally hold the grinding wheel C out of engagement with the saw D or $D'$, and the swinging movement of the arm B to the right is limited by a set screw $B^6$, screwing in a bearing $A^3$, carried by the main frame A. Now when the machine is running, the cam J imparts a swinging motion to the lever $J^2$, so that the arm $J^5$ thereof acts on the nut L, and in doing so imparts a swinging motion to the arm B, to swing the same from the right to the left to move the grinding wheel C in grinding engagement with the front and throat of a tooth, as plainly indicated in Fig. 8. During this movement of the arm B from the right to the left, the spring $B^5$ is placed under tension, and when the friction roller $J'$ has passed the crown of the cam J, then a return swinging movement of the arm B takes place owing to the action of the spring $B^5$, and consequently the grinding wheel C is gradually moved out of engagement with the front and throat of the tooth.

From the foregoing it will be seen, that by the arrangement described, the grinding wheel C is moved in grinding engagement with the tooth of a saw and back to normal position, during each revolution of the cam shaft $I^2$.

It is understood that on adjusting the screw rod $N^5$, the block $J^3$ is raised or lowered and with it the lever $J^2$, to change the latter's position relative to the cam J, and by adjusting the screw rod $L^3$, a swinging motion is imparted to the lever $J^2$, for changing the position of this lever relative to the cam J. By the two adjustments described, the sidewise bodily movement given to the grinding wheel C can be regulated to the minutest degree, according to the shape and location of the tooth of the saw under treatment at the time.

Figure 9:
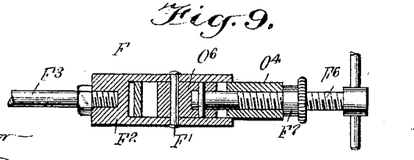
Fig. 9 is an enlarged transverse section of part of the saw-feeding device.
Figure 10:
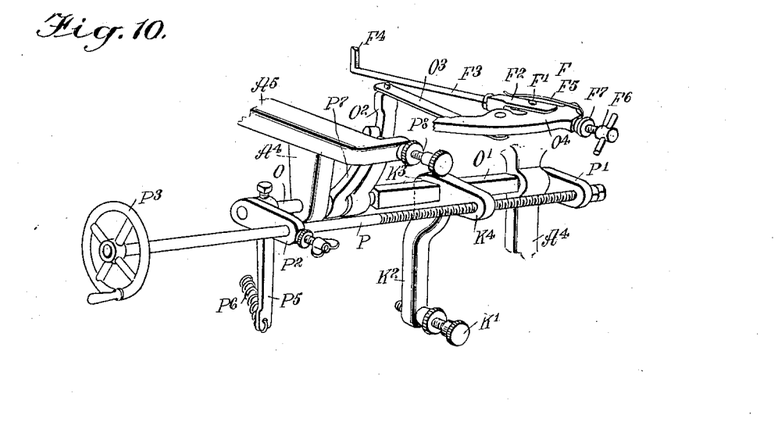
Fig. 10 is a perspective view of the saw feed device.
Figure 11:
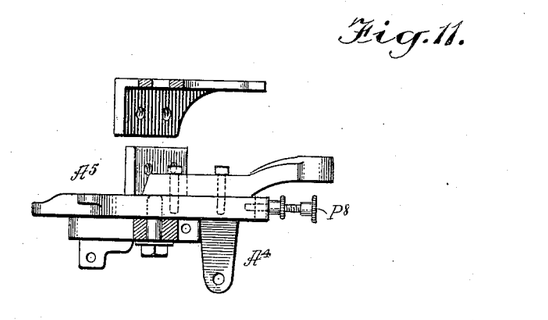
Fig. 11 is a side elevation of an adjustable part of the main frame, one of the members being shown detached.
Figure 12:
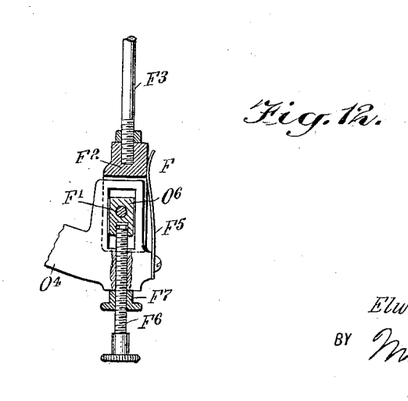
Fig. 12 is a sectional plan view of part of the feed device.

The cam K is a face cam and its face is engaged by a set screw $K'$, held in the lower end of an arm $K^2$, having a polygonal eye $K^3$ slidingly engaging the polygonal portion $O'$ of a rock shaft O, extending lengthwise and journaled in suitable bearings arranged on brackets $A^4$, forming part of the main frame A. On the rock shaft O is secured an upwardly-extending arm $O^2$, pivotally connected by a link $O^3$ with an arm $O^4$, pivoted at $O^5$ on a bracket $A^5$, forming part of the main frame A. On the arm $O^4$ is arranged a sliding block $O^6$, carrying a vertically-disposed pivot pin $F'$, on which is mounted to swing a head $F^2$, provided with a rod $F^3$, terminating in an upwardly-extending finger $F^4$, adapted to engage one of the teeth of the saw D or $D'$, preferably the one in front of the tooth to be sharpened by the grinding wheel C at the time. A spring $F^5$ held on the arm $O^4$ presses the head $F^2$, so as to hold the finger $F^4$ in contact with the tooth and to allow sidewise swinging of the head $F^2$, rod $F^3$ and finger $F^4$, when the latter passes from one tooth to the next following one during the return stroke of the arm $O^4$. The head $F^2$ is held adjustably, and for this purpose a screw rod $F^6$ is mounted to turn in the block $O^6$ and screws in the arm $O^4$, so as to move the head $F^2$ in the direction of its length, to bring the finger $F^4$ in proper relation to the tooth of the saw D or $D'$ to be sharpened at the time. When the desired adjustment is made, the screw rod $F^6$ is locked in place by a jam nut $F^7$, as plainly indicated in Fig. 9. Now when the machine is running, the cam K acts on the set screw $K'$ of the arm $K^2$, to impart a transverse swinging motion to the same, thus rocking the shaft O, which by the arm $O^2$ and the link $O^3$ imparts a transverse swinging movement to the arm $O^4$, to cause the finger $F^4$ to intermittently feed the saw D or $D'$ forward a distance corresponding to the length of a tooth.

In order to aid the feeding device just described to feed saws having teeth of different length, the following arrangement is made: The upper end of the arm $K^2$ is provided with a nut $K^4$, in which screws a screw rod P, mounted to rotate in arms $P'$ and $P^2$ attached to the ends of the rock shaft O. On one outer end of the screw rod P is a hand wheel $P^3$ under the control of the operator, to turn the screw rod P and thus shift the arm $K^2$ lengthwise on the said screw rod, to cause the cam K to engage the set screw $K'$ sooner or later, according to the direction in which the arm $K^2$ is moved, by the operator turning the screw rod P. When the desired adjustment is made, the screw rod P is fastened in place in the bearing $P^2$ by a set screw $P^4$.

In order to hold the set screw $K'$ in proper relation to the face of the cam K, use is made of an arm $P^5$, depending from the rock shaft O and connected with a spring $P^6$, attached to the main frame A (see Figs. 1, 2 and 3), to impart a rearward swinging motion to the arm $K^2$, which rearward movement, however, is limited by an arm $P^7$, secured to the rock shaft O and abutting against a set screw $P^8$ held on the main frame A.

The saw support E for the straight or band saw D is arranged as follows: The saw support E is in the form of a horizontally-disposed plate, provided at the side next to the grinding wheel C with a rabbet $E^2$ having an undercut, and extending obliquely, as plainly indicated in Fig. 3, the width of the rabbet being less than that of the saw D, so that the teeth of the saw project beyond the right-hand side of the support E for the grinding wheel C to engage the teeth of the saw, without danger of cutting into the support E. The support E is adjustably fastened by a vertical bolt $E^3$ to a slotted arm $A^6$ of the bracket $A^5$, and a horizontally-extending adjusting screw $E^4$ screws in the rear of the said support and abuts against the arm $A^6$, so that when the bolt $E^3$ is loosened, the operator can swing the support E horizontally into the desired oblique position in which the support is fastened by the bolt $E^3$ and the adjusting screw $E^4$.

A button Q is in engagement with and presses the top of the saw D opposite the tooth to be sharpened by the grinding wheel C. The button Q is held on the free end of a spring $Q'$, clamped to the upper end of a stud $Q^2$, adjustably secured to a slotted arm $A^7$ of the bracket $A^5$. A spring R presses with its free end against the points of the saw teeth to hold the saw against the undercut wall of the rabbet $E^2$, and the said spring R is provided with a hub $R'$ (see Fig. 2), engaging the stud $Q^2$ and secured thereto by a set screw $R^2$. The bracket $A^5$ which carries the lever $O^4$ of the feed device F and the saw support E, is preferably held adjustable on the main frame A, to allow of quickly and correctly assembling the parts.

The saw support $E'$ for the circular saw $D'$ consists of a stud $E^5$, rising from a slotted bracket $E^6$, adjustably secured by a bolt $E^7$ to a slotted arm $A^8$, forming part of the main frame A. On the stud $E^5$ is placed a cone $E^8$, adapted to engage the eye of the saw D', to readily center the same on the stud E⁵. The bracket E⁶ is provided with a rising extension E⁹ (see Figs. 6 and 7) forming a rest for the circular saw adjacent the stud E⁵ and cone E⁸.

The saw D' adjacent the grinding wheel is supported on a support A⁹, forming part of an extension of the bracket A⁵.

It is understood that when a circular saw D' is sharpened, the support E is removed and the spring R is swung out of the way, but use is made of the spring-pressed button Q.

The operation is as follows: When it is desired to sharpen a straight or band saw D, the latter is placed in position on the rabbet E² of the support E, and the finger F⁴ is engaged with one of the teeth of the said saw. The operator now imparts a swinging motion to the lever H⁸ in the direction of the arrow a', so that the cam shaft wheel I' is rotated, as previously explained, whereby a sidewise swinging motion is given to the arm B, to move the rotating grinding wheel C in engagement with the front and throat of a tooth on the saw D. The grinding wheel C moves quickly into and out of engagement with front and throat of the tooth of the saw, and as soon as the grinding wheel C starts on the receding or return movement, the feeding device F is actuated by the cam K, so that the saw D is pushed rearwardly in the direction of the arrow c', whereby the back of the next following tooth is moved in contact with the bevel face C² of the grinding wheel C. During the final return movement of the grinding wheel C, the feeding of the saw D is completed, and then the feeding device F returns to its previous position, by engaging the finger F⁴ with the next following tooth. As soon as the feeding of the saw D is completed, the grinding wheel C again moves into active position, to grind the front and throat of the next tooth, and the above described operation is repeated. When it is desired to grind the teeth of a circular saw D', the support E is removed, as previously mentioned, and the circular saw is mounted on the support E', by placing the eye of the saw D' in position on the stud E⁵ and centering the circular saw thereon by the insertion of the cone E⁸. The spring R used for holding the band saw D in position is preferably swung out of the way, as it is not necessary, but the spring-pressed button Q is used to hold the circular saw D' down on the support A⁹ (see Figs. 6 and 7). The feeding device F is used in the same manner as previously described, that is, when the machine is running the finger F⁴ engages one of the teeth of the circular saw D', to turn the latter on the cone E⁸, as the center, and the grinding wheel C is bodily moved sidewise, to engage the front and throat of a tooth while the saw D' is at rest, and to grind the back of the next following tooth during the receding movement of the grinding wheel C and the forward feeding of the saw D' by the feeding device F.

It is understood that the screw rod N⁵ serves to give a minute adjustment to the levers N³ and J², and the screw rod L³ serves to adjust the said levers according to the diameter of the grinding wheel C used at the time, that is, for larger grinding wheels the arm B is set farther to the right by the use of the screw rod L³ than is required for grinding wheels C of smaller diameter.

Having thus described my invention, I claim as new and desire to secure by Letters Patent:

1. An automatic saw sharpening machine, comprising a saw support, a revoluble grinding wheel, a spring-pressed pivoted arm in which the said grinding wheel is journaled, a revoluble cam, an adjustable connection between the said cam and the said arm to periodically move the grinding wheel into grinding contact with the saw and to allow the spring of the arm to return the latter and the grinding wheel, a second cam rotating in unison with the said first-named cam, a pivoted pushing device for imparting an intermittent feeding motion to the saw, and an adjustable connection between the said second cam and the said pushing device.

2. An automatic saw sharpening machine comprising a saw support, a revoluble grinding wheel, a spring-pressed pivoted arm in which the said grinding wheel is journaled, a revoluble cam, an adjustable connection between the said cam and the said arm to periodically move the grinding wheel into grinding contact with the saw and to allow the spring of the arm to return the latter and the grinding wheel, a second cam rotating in unison with the said first-named cam, a pivoted pushing device for imparting an intermittent feeding motion to the saw, an adjustable connection between the said second cam and the said pushing device, a main driving shaft for driving the said grinding wheel, a cam shaft carrying the said cams, and a friction drive between the said shafts.

3. An automatic saw sharpening machine comprising a saw support, a revoluble grinding wheel, a spring-pressed pivoted arm in which the said grinding wheel is journaled, a revoluble cam, an adjustable connection between the said cam and the said arm to periodically move the grinding wheel into grinding contact with the saw and to allow the spring of the arm to return the latter and the grinding wheel, a second cam rotating in unison with the said first-named cam, a pivoted pushing device for imparting an intermittent feeding motion to the saw, an adjustable connection between the said second cam and the said pushing device, a main driving shaft, pivoted bearings for the said driving shaft, a cam shaft carrying the said cams, wheels on the said cam shaft and the said main shaft, and manually-controlled means for imparting a swinging motion to one of the said main shaft bearings to move the said shaft wheels in or out of engagement.

4. An automatic saw sharpening machine provided with a saw support, means for intermittently feeding the saw, a revoluble grinding wheel for engagement with the teeth of the saw, a pivoted arm on which the said grinding wheel is journaled, a revoluble cam, a lever controlled by the said cam, means for bodily raising or lowering the said lever to change the position of the latter relatively to the cam, and means for imparting a swinging motion to the said lever to adjust the same relatively to the cam.

5. An automatic saw sharpening machine provided with a saw support, a revoluble grinding wheel, a pivoted arm on which the grinding wheel is journaled, a screw rod mounted to turn on the said arm, a nut screwing on the said screw rod, a cam lever carrying the said nut, and a revoluble cam periodically engaging the said cam lever to impart a swinging motion to the said arm.

6. An automatic saw sharpening machine provided with a saw support, a revoluble grinding wheel, a pivoted arm on which the grinding wheel is journaled, a screw rod mounted to turn on the said arm, a nut screwing on the said screw rod, a cam lever engaging the said nut, a revoluble cam periodically engaging the said cam lever to impart a swinging motion to the said arm, a sliding block on which the said cam lever is fulcrumed, and manually-controlled means for shifting the said sliding block.

7. An automatic saw sharpening machine provided with a saw support, a revoluble grinding wheel, a pivoted arm on which the grinding wheel is journaled, a screw rod mounted to turn on the said arm, a nut screwing on the said screw rod, a cam lever engaging the said nut, a revoluble cam periodically engaging the said cam lever to impart a swinging motion to the said arm, and a spring connected with the said arm to return the latter.

8. An automatic saw sharpening machine provided with a saw support, a revoluble grinding wheel, a pivoted arm on which the grinding wheel is journaled, a screw rod mounted to turn on the said arm, a nut screwing on the said screw rod, a cam lever engaging the said nut, a revoluble cam periodically engaging the said cam lever to impart a swinging motion to the said arm, a spring connected with the said arm to return the latter, and an adjustable stop for limiting the return movement of the said arm.

9. An automatic saw sharpening machine provided with a saw support, a revoluble grinding wheel, a pivoted arm on which the grinding wheel is journaled, a screw rod mounted to turn on the said arm, a nut screwing on the said screw rod, a cam lever engaging the said nut, a revoluble cam periodically engaging the said cam lever to impart a swinging motion to the said arm, a spring for returning the said arm, a sliding block on which the cam lever is pivoted, a hand lever having a connection with the said block, a pivoted half nut on the said hand lever, and a screw rod mounted to turn and on which screws the said half nut.

10. A saw sharpening machine provided with a revoluble grinding wheel having bodily movement toward and from the saw to be sharpened, an adjustable saw support, and a feed device for periodically advancing the saw, the feed device comprising a revoluble face cam, a rock shaft having arms, one of which is adapted to be actuated by said cam, said arm being adjustable along the shaft to cause it to be engaged by the cam sooner or later according to the direction in which the arm is moved, a link connected with the other rock shaft arm, a lever connected with the said link, a pivoted and spring pressed head adjustably mounted on the said lever, and a push bar on the said head and having a finger engaging a tooth of a saw.

11. A saw sharpening machine provided with a revoluble grinding wheel having bodily movement toward and from the saw to be sharpened, an adjustable saw support, and a feed device for periodically advancing the saw, the feed device comprising a revoluble face cam, a rock shaft having arms, of which one is a cam arm and adapted to be actuated by the said cam, a link connected with the other rock shaft arm, a lever connected with the said link, a head mounted to swing on the said lever, a push bar on the said head and having a finger engaging a tooth of the saw, manually-controlled means for adjusting the said head, and manually-controlled means for shifting the said cam arm on the said rock shaft.

12. In a saw sharpening machine, a saw support having a shoulder against which the saw rests, a spring arm carrying at its free end a button for engaging the top of the saw, means for adjustably mounting the spring arm and a spring for engaging the teeth of the saw, said spring being adjustably mounted on the means for mounting the spring arm.

13. In a saw sharpening machine, a saw support having a shoulder against which the saw rests, a spring arm for engaging the top of the saw, a stud by means of which the arm is secured in position, a spring for engaging the teeth of the saw, said spring having a hub mounted on the stud, and a screw for securing the hub of the spring in position.

14. In a saw sharpening machine, a rock shaft provided with a fixed arm and a slidable arm, a cam for operating the shaft by means of the slidable arm, a pivoted lever, a link connecting the arm of the rock shaft with the lever, a push rod carried by the lever for engaging a saw tooth, a nut carried by the slidable arm of the rock shaft, and a screw rod working in said nut.

15. In a saw sharpening machine, a pivoted arm, a grinding wheel mounted in the arm, a pivoted and counterbalanced lever provided with an upwardly projecting arm, a cam with which the lever engages, a screw rod mounted in the said arm, and a nut on the screw rod and with which the arm of the lever engages.

16. In a saw sharpening machine, a pivoted arm, a grinding wheel mounted in the arm, a slidable block provided with a lateral pin, a pivoted and counterbalanced lever carried by the block and provided with an upwardly projecting arm, a cam with which the lever engages, a screw rod mounted in the pivoted arm, a nut on the screw rod and with which the arm of the lever engages, and a lever provided with a slot through which the pin of the block passes.

17. In a saw sharpening machine, a pivoted arm, a grinding wheel mounted in the arm, a slidable block provided with a lateral pin, a pivoted and counterbalanced lever carried by the block and provided with an upwardly projecting arm, a cam with which the lever engages, a screw rod mounted in the pivoted arm, a nut on the screw rod and with which the arm of the lever engages, a lever provided with a slot through which the pin of the block passes, a screw rod, and a pivoted nut on the lever and with which the screw rod engages.

18. In a saw sharpening machine, a swinging and revolving grinding wheel, a saw feeding device, a driving shaft, a bearing for one end of the shaft hung on trunnions, a bearing in which the other end of the shaft is mounted, pivoted at one side, a spring pressed yoke engaging the free end of said bearing, a pivoted lever engaging the yoke, a second lever engaging the first lever, a friction pinion on one end of the driving shaft, a friction wheel with which the pinion is adapted to engage, and means for operating the saw feeding device and swinging the grinding wheel from the friction wheel.

In testimony whereof I have signed my name to this specification in the presence of two subscribing witnesses.

ELWIN SOLON BERRY.

Witnesses:
WALTER C. WASHBURN,
BURTON E. BAILEY.